(12) United States Patent
Wolk et al.

(10) Patent No.: US 11,098,636 B2
(45) Date of Patent: Aug. 24, 2021

(54) EXHAUST MANIFOLD TO TURBINE CONNECTION

(71) Applicant: Caterpillar Inc., Peoria, IL (US)

(72) Inventors: Matthew T. Wolk, Peoria, IL (US); Vikas Bhupendra Sheth, Edwards, IL (US)

(73) Assignee: Caterpillar Inc. Joint OC, Peoria, IL (US)

( * ) Notice: Subject to any disclaimer, the term of this patent is extended or adjusted under 35 U.S.C. 154(b) by 0 days.

(21) Appl. No.: 16/718,412

(22) Filed: Dec. 18, 2019

(65) Prior Publication Data

US 2021/0189942 A1 Jun. 24, 2021

(51) Int. Cl.
| | | |
|---|---|---|
| *F01N 13/18* | (2010.01) | |
| *F01N 13/10* | (2010.01) | |
| *F02B 37/02* | (2006.01) | |
| *F01N 5/04* | (2006.01) | |

(52) U.S. Cl.
CPC ........... *F01N 13/1855* (2013.01); *F01N 5/04* (2013.01); *F01N 13/10* (2013.01); *F01N 13/1805* (2013.01); *F02B 37/02* (2013.01)

(58) Field of Classification Search
CPC . F02B 37/02; F01N 5/04; F01N 13/10; F01N 13/1805; F01N 13/1855
See application file for complete search history.

(56) References Cited

U.S. PATENT DOCUMENTS

| | | |
|---|---|---|
| 5,406,795 A | 4/1995 | Raub et al. |
| 6,892,532 B2 | 5/2005 | Bruce et al. |
| 8,474,251 B2 | 7/2013 | Beyer et al. |
| 10,190,489 B2 | 1/2019 | Takamiya |
| 10,907,649 B2 * | 2/2021 | Kitamura ................ F02B 37/18 |
| 2003/0053910 A1 | 3/2003 | Hosny |
| 2009/0026009 A1 * | 1/2009 | Itoh ...................... F01N 13/107 |
| | | 181/227 |
| 2009/0126659 A1 * | 5/2009 | Lester .................... F02B 67/10 |
| | | 123/41.72 |
| 2011/0277466 A1 * | 11/2011 | Danielewicz ....... F01N 13/1805 |
| | | 60/598 |
| 2018/0340462 A1 | 11/2018 | Hideshima et al. |

FOREIGN PATENT DOCUMENTS

| | | |
|---|---|---|
| DE | 102015213470 A1 | 1/2017 |
| EP | 3415734 | 12/2018 |

* cited by examiner

*Primary Examiner* — Brandon D Lee
(74) *Attorney, Agent, or Firm* — Xsensus LLC (57) ABSTRACT

A turbocharger having a turbine housing including an outer surface and an inner surface defining an exhaust passage, an exhaust inlet port in fluid communication with the exhaust passage, and a tucked exhaust inlet flange surrounding the exhaust inlet port, the exhaust inlet flange including a plurality of bolt holes arranged in a trapezoid shaped bolt pattern.

20 Claims, 8 Drawing Sheets

EXHAUST MANIFOLD TO TURBINE CONNECTION

TECHNICAL FIELD

This disclosure relates generally to an exhaust system of an internal combustion engine and, more specifically, to a turbocharger, an exhaust manifold, and the connection therebetween.

BACKGROUND

The use of turbochargers in internal combustion engines is well known. Turbochargers increase the mass of air supplied to the engine thereby enabling the increase of the power output of the engine. In addition, the efficiency of the engine is increased by the turbocharger's utilization of the thermal energy contained in the engine's exhaust gases.

The connection between a turbocharger and the engine, however, may pose various design challenges. For the engine to operate at optimum efficiency, the engine must transfer as much energy as possible from the exhaust gases of the engine to a turbine of the turbocharger, thereby maximizing the boost provided by the turbocharger. Energy, however, is lost as the exhaust gases flow through the exhaust manifold and from the exhaust manifold into the turbocharger. Thus, the design of the exhaust passage in both the exhaust manifold and the turbine portion of the turbocharger are important to minimizing these energy losses.

Furthermore, as modern engines and engine systems become more complex and include more components, constraints on spacing between components on engines and constraints on the amount of space available for an engine in the engine compartment of work machines also increase. Thus, design challenges also exist regarding spacing constraints and assembly constraints.

U.S. Pat. No. 5,406,795 ("the '795 patent") issued to Raub et al. on Apr. 18, 1995 discloses a conventional prior art exhaust manifold outlet flange design that includes two generally rectangular ports separated by a dividing wall. The '795 patent further discloses an alternative exhaust manifold outlet flange having two exhaust ports separated by a divider wall where the configuration of the pair of ports and divider wall resembles a bow tie. This configuration allows the ports to have the same area and the flange to maintain the same bolt pattern as the conventional rectangular port design while reducing the thermal inertia and stiffness of the surrounding constraining material of the flanges, thereby improving transient response and reducing thermal stress.

SUMMARY

In accordance with one aspect of the present disclosure, a turbocharger includes a turbine housing having an outer surface and an inner surface defining an exhaust passage, an exhaust inlet port in fluid communication with the exhaust passage, and a tucked exhaust inlet flange surrounding the exhaust inlet port, the exhaust inlet flange including a plurality of bolt holes arranged in a trapezoid-shaped bolt pattern.

In accordance with another aspect of the present disclosure, an internal combustion engine includes one or more cylinders, an exhaust manifold in fluid communication with the one or more cylinders, and a turbocharger having a turbine portion in fluid communication with the exhaust manifold. The turbocharger includes a turbine housing having an outer surface and an inner surface defining an exhaust passage, an exhaust inlet port in fluid communication with the exhaust passage, and a tucked exhaust inlet flange surrounding the exhaust inlet port, the exhaust inlet flange including a plurality of bolt holes arranged in a trapezoid-shaped bolt pattern.

BRIEF DESCRIPTION OF THE DRAWINGS

Further features and advantages will be evident from the following illustrative embodiment which will now be described, purely by way of example and without limitation to the scope of the claims, and with reference to the accompanying drawings, in which:

DETAILED DESCRIPTION

While the present disclosure describes certain embodiments of a turbocharger and exhaust manifold for an internal combustion engine, the present disclosure is to be considered exemplary and is not intended to be limited to the disclosed embodiments. Also, certain elements or features of embodiments disclosed herein are not limited to a particular embodiment, but instead apply to all embodiments of the present disclosure.

Figure 1:
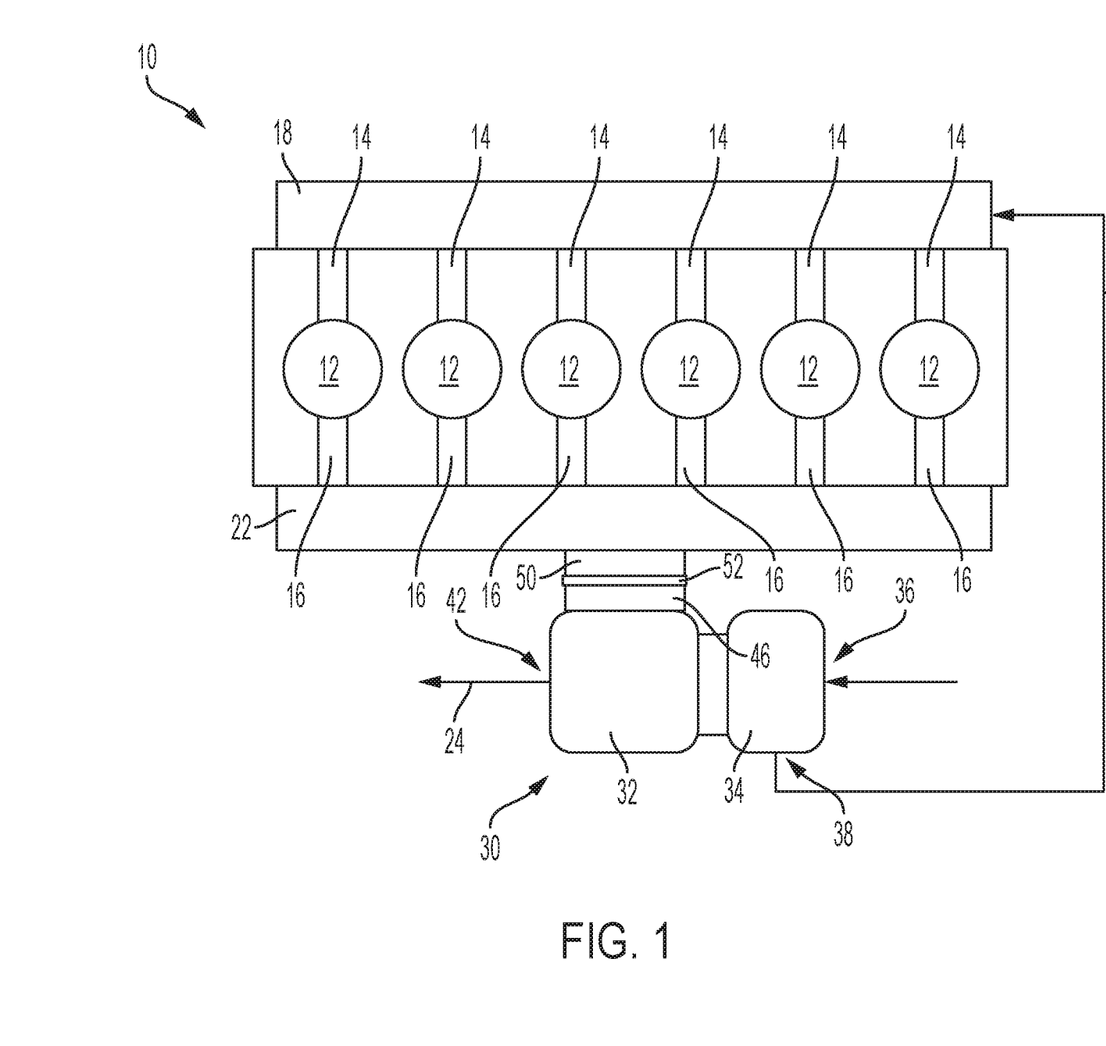
FIG. 1 is a schematic illustration of an engine with an exhaust system including a turbocharger.
Figure 2:
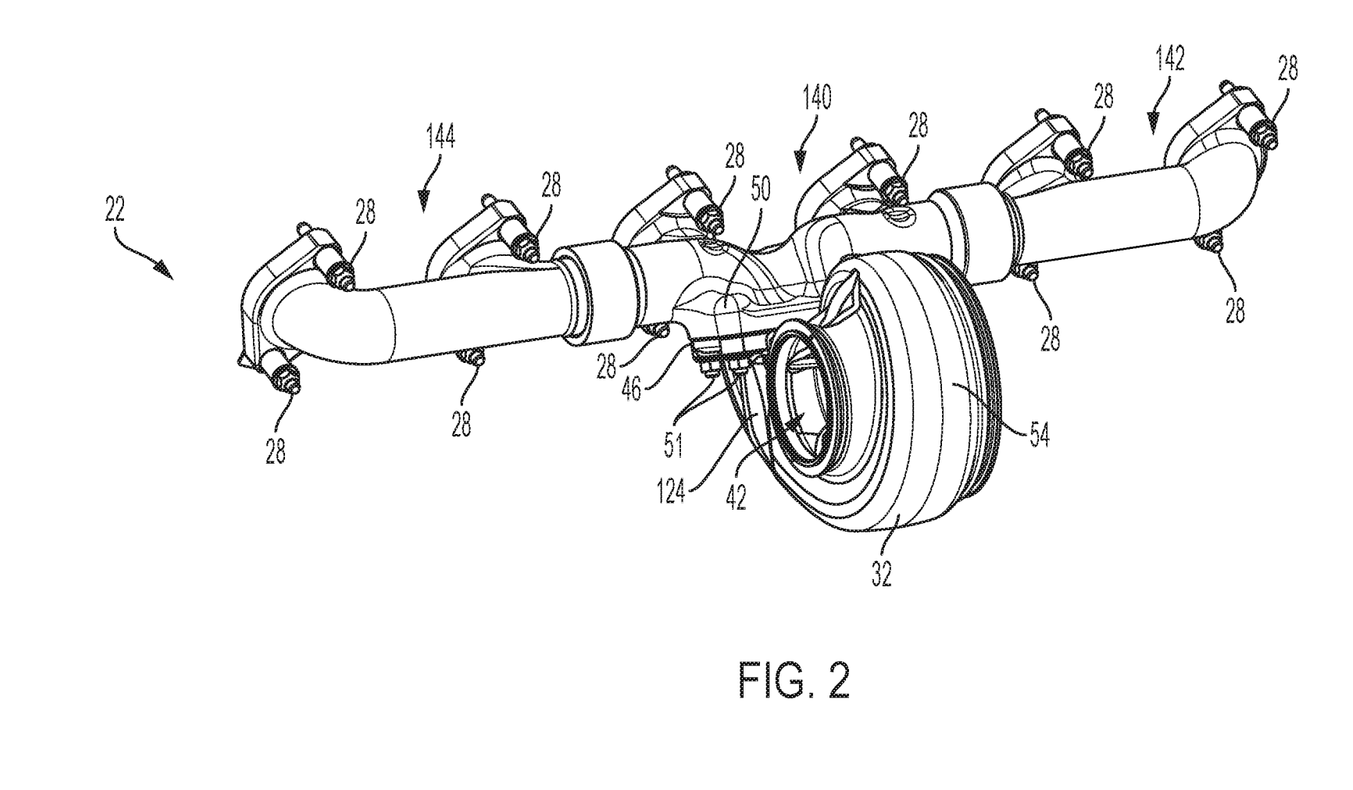
FIG. 2 is a perspective view of an exemplary embodiment of a turbine portion of a turbocharger attached to an exhaust manifold of the engine of FIG. 1.

Referring to FIGS. 1-2, an exemplary embodiment of an internal combustion engine 10, such as a diesel engine, is shown. The engine 10 may provide power to various types of applications and/or machines. For example, the engine 10 may power a machine such as an off-highway truck, a railway locomotive, an earth-moving machine, such as a wheel loader, excavator, dump truck, backhoe, motor grader, material handler, or the like. The term "machine" can also refer to stationary equipment like a generator that is driven by the engine 10 to generate electricity.

The engine 10 includes one or more cylinders 12 implemented therein. In the illustrated embodiment, the engine 10 includes six cylinders 12. In other embodiments, however, the engine 10 may include more or less than six cylinders 12. The engine 10 may be of an in-line type, as illustrated, a V-type, a rotary type, or other types known in the art. Each of the cylinders 12 may be configured to slidably receive a piston (not shown) therein.

Each of the cylinders 12 includes one or more intake ports 14, each having an intake valve (not shown) and one or more exhaust ports 16, each having an exhaust valve (not shown). The intake valve and the exhaust valve are configured to regulate fluid communication into and out of the cylinders 12 via the one or more intake ports 14 and the one or more exhaust ports 16, respectively. The engine 10 includes an intake manifold 18 in fluid communication with one or more cylinders 12 and with an intake line 20 and an exhaust manifold 22 in fluid communication with the one or more cylinders 12 and with an exhaust line 24. Intake air enters the one or more intake ports 14 from the intake line 20 via the intake manifold 18 and exhaust enters the exhaust line 24 from the one or more exhaust ports 16 via the exhaust manifold 22. The exhaust manifold 22 is configured to mount onto one or more cylinder heads (not shown) on the engine 10. In the illustrated embodiments, the exhaust manifold 22 and the one or more cylinder heads (not shown) are connected by a plurality of bolts 28 (FIG. 2). However, other connection devices may be used, such as a plurality of studs and nuts.

The engine 10 includes a turbocharger 30 having an exhaust turbine portion 32 and an intake air compressor portion 34. The compressor portion 34 includes an air inlet 36 and an air outlet 38. The air outlet 38 is in fluid communication with the intake line 20. The exhaust turbine portion 32 has an exhaust inlet 40 (FIG. 3) and an exhaust outlet 42. The exhaust outlet 42 is in fluid communication with the exhaust line 24.

The exhaust inlet 40 of the turbocharger 30 includes an exhaust inlet flange 46 (i.e., the turbine foot) surrounding an exhaust inlet port 48. The exhaust inlet flange 46 is configured to connect to an exhaust manifold outlet flange 50 on the exhaust manifold 22. In the illustrated embodiment, the exhaust inlet flange 46 of the turbocharger 30 and the exhaust manifold outlet flange 50 of the exhaust manifold 22 are connected by a plurality of bolts 51 (FIG. 2). However, other connection devices may be used, such as a plurality of studs and nuts. In the illustrated embodiment, a gasket 52 is positioned between the exhaust manifold outlet flange 50 and the exhaust inlet flange 46. The gasket 52 has bolt holes (not shown) in the same bolt pattern as the exhaust manifold outlet flange 50 and the exhaust inlet flange 46, which is described below in more detail.

Figure 3:
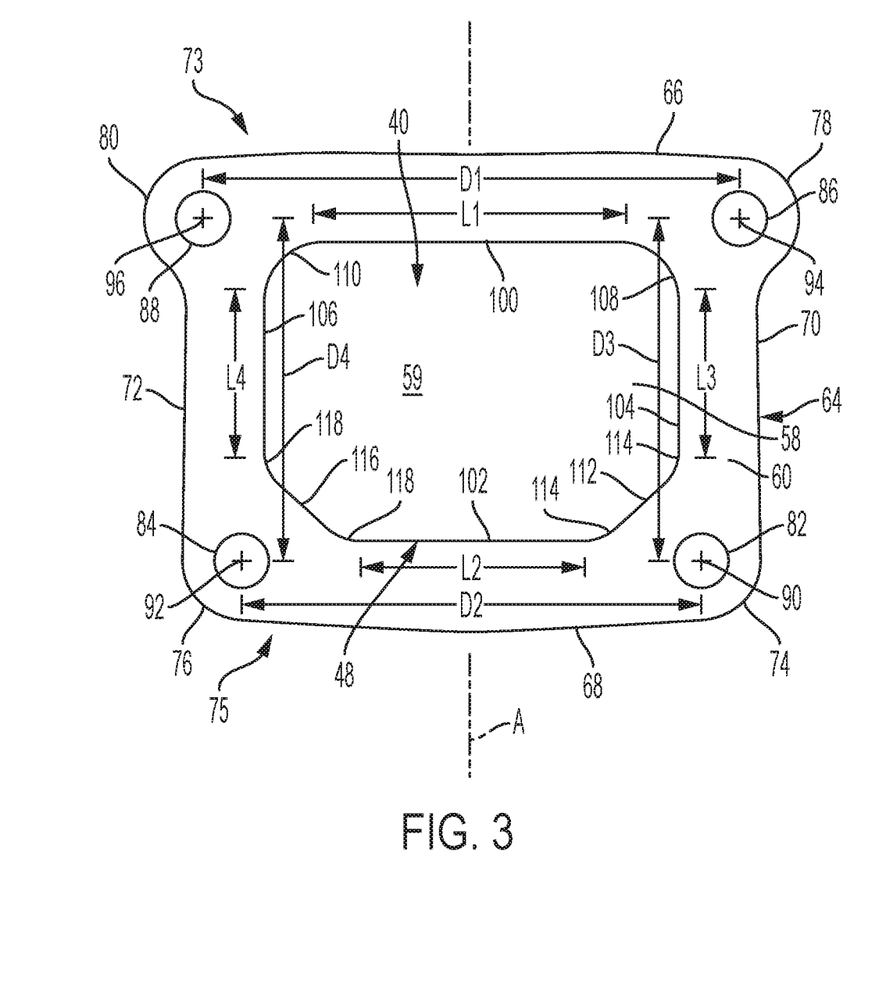
FIG. 3 is a front view of an exemplary embodiment of an exhaust inlet flange for the turbine of FIG. 2.
Figure 4:
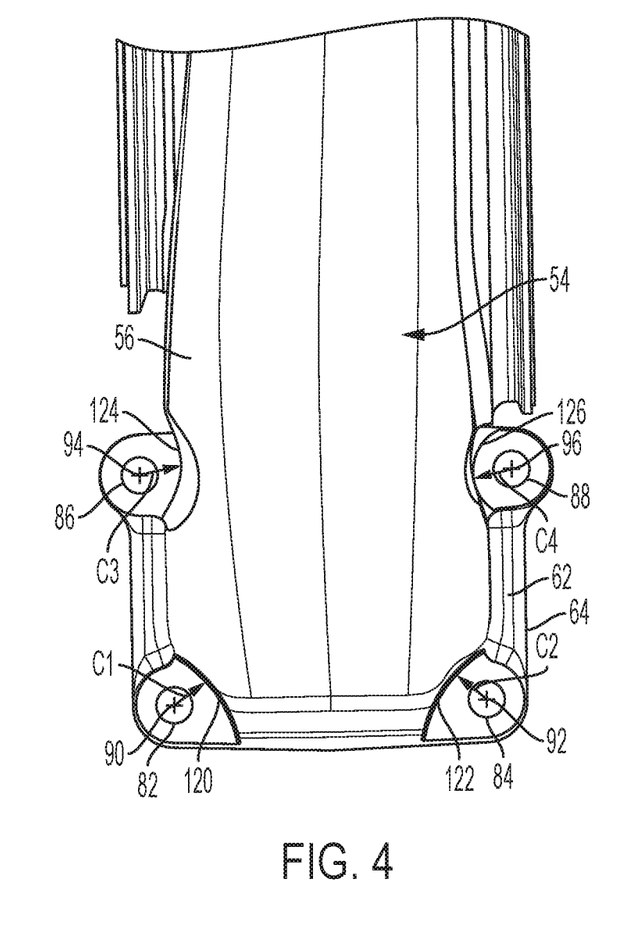
FIG. 4 is a rear view of the exhaust inlet flange of FIG. 3.
Figure 5:
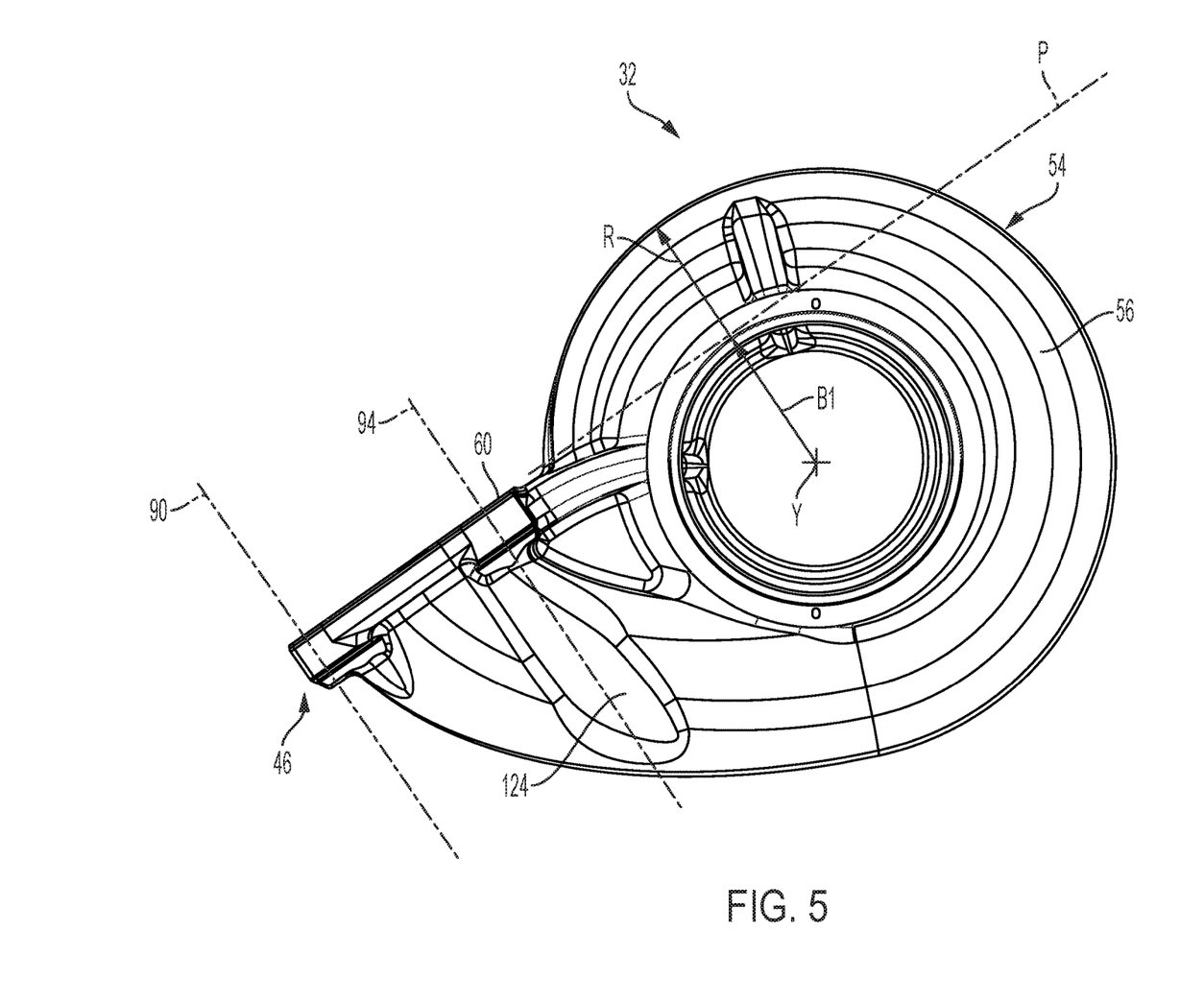
FIG. 5 is a side view of the turbine portion of FIG. 2.

Referring to FIGS. 3-5, the turbine portion 32 of the turbocharger 30 has a turbine housing 54 having one or more outer surfaces 56 and one or more inner surfaces 58. The inner surfaces 58 define the exhaust inlet port 48 and a spiraling exhaust passage 59 (i.e., a volute) in fluid communication with the exhaust inlet port 48 and extending from the exhaust inlet port 48 to the exhaust outlet 42. As shown in FIG. 5, the exhaust passage 59 spirals about a central axis Y and the turbine housing 54 has a radius R that decreases as the exhaust passage 59 spirals inward.

In the illustrated embodiment, the inner surfaces 58 bounding the exhaust passage 59 are integral with and transition smoothly into the exhaust inlet flange 46 such that the exhaust passage 59 smoothly transitions into the exhaust inlet port 48. The exhaust inlet flange 46 includes a planar end face 60, an exterior surface 62 opposite the end face 60, and a peripheral edge 64 connecting the end face 60 to the exterior surface 62. As shown in FIG. 5, the plane P defined by the planar end face 60 is a distance B1 from the central axis Y. The distance B1 represents the shortest distance between the plane P and the central axis Y. In some exemplary embodiments, the exhaust inlet flange 46 is in a tucked configuration. As used in this disclosure, an exhaust inlet flange 46 is "tucked" when the distance B1 is less than, or equal to, the radius R along the same radial line. An "extended" configuration is when the distance B1 is greater than the radius R along the same radial line (i.e., exhaust inlet flange 46 extends beyond the turbine housing 54).

In some exemplary embodiments, the distance B1 is less than 80% of the radius R along the same radial line, or is less than 70% of the radius R along the same radial line, or is less than 60% of the radius R along the same radial line. In one exemplary embodiment, the exhaust inlet flange 46 is a distance B1 in the range of 50% to 60% of the radius R along the same radial line.

In the illustrated embodiment, the peripheral edge 64 includes a first outer edge 66, a second outer edge 68 parallel to and opposite the first outer edge 66, a third outer edge 70 extending between the first outer edge 66 and the second outer edge 68, and a fourth outer edge 72 parallel to and opposite the third outer edge 70 and extending between the first outer edge 66 and the second outer edge 68. With respect to the direction that the exhaust passage 59 spirals, the first outer edge 66 is at an inner side 73 of the turbine housing 54 and the second outer edge 68 is at an outer side 75 of the turbine housing 54.

The second outer edge 68 transitions to the third outer edge 70 via a first rounded corner 74 and transitions to the fourth outer edge 72 via a second rounded corner 76. The first outer edge 66 transitions to the third outer edge 70 via a third rounded corner 78 and transitions to the fourth outer edge 72 via a fourth rounded corner 80. The third rounded corner 78 and the fourth rounded corner 80 extend laterally outward of the third outer edge 70 and the fourth outer edge 72, respectively.

The exhaust inlet flange 46 includes a plurality of bolt holes for mounting the turbocharger 30 to the exhaust manifold 22. In the illustrated embodiment, a first hole 82 is positioned adjacent the first rounded corner 74, a second hole 84 is positioned adjacent the second rounded corner 76, a third hole 86 is positioned adjacent the third rounded corner 78, a fourth hole 88 is positioned adjacent the fourth rounded corner 80. The first hole 82 is centered on a first axis 90 that extends perpendicular to the end face 60, the second hole 84 is centered on a second axis 92 that extends perpendicular to the end face 60, the third hole 86 is centered on a third axis 94 that extends perpendicular to the end face 60, and the fourth hole 88 is centered on a fourth axis 196 that extends perpendicular to the end face 60.

In the illustrated embodiment, the third axis 94 is a first distance D1 from the fourth axis 96, the first axis 90 is a second distance D2 from the second axis 92, the first axis 90 is a third distance D3 from the third axis 94, and the second axis 92 is a fourth distance D4 from fourth axis 96. In the exemplary embodiment, the first distance D1 is greater than the second distance D2 and the third distance D3 is equal to the fourth distance D4. In the exemplary embodiment, a first line intersecting the first axis 90 and the second axis 92 is parallel to a second line intersecting the third axis 94 and the fourth axis 96. Thus, the bolt pattern for the exhaust inlet flange 46 takes the shape of a trapezoid.

In one exemplary embodiment, the first distance D1 is in the range of 108 mm to 118 mm, or 113 mm and the second distance D2 is in the range of 90 mm to 100 mm, or 95 mm. Thus, the ratio of the first distance D1 to the second distance D2 is in the range of 1.08 to 1.31, or 1.19. The third distance D3 and the fourth distance D4 are in the range of 65 mm to 75 mm, or 70 mm.

In an exemplary embodiment, the exhaust inlet port 48 is a single, open port that is symmetric about a central axis A. Thus, the exhaust inlet port 48 is not divided into two ports by a dividing wall and is the sole exhaust inlet port for the turbocharger 30. In other embodiments, however, the exhaust inlet port 48 may not be symmetric about the central axis A. The exhaust inlet port 48 includes a first linear portion 100, a second linear portion 102 spaced apart from and parallel to the first linear portion 100, a third linear portion 104 perpendicular to and extending between the first linear portion 100 and the second linear portion 102, and a fourth linear portion 106 parallel to the third linear portion 104 and perpendicular to and extending between the first linear portion 100 and the second linear portion 102.

The first linear portion 100 transitions to the third linear portion 104 via a first inner rounded corner 108 and transitions to the fourth linear portion 106 via a second inner rounded corner 110. The second linear portion 102 transitions to the third linear portion 104 via a first angled portion 112 positioned between a pair of first shallow curved portions 114 and transitions to the fourth linear portion 106 via a second angled portion 116 positioned between a pair of second shallow curved portions 118. In some exemplary embodiments, the first angled portion 112 forms an angle relative to the second linear portion 102 in the range of 40 degrees to 60 degrees, or 45 degrees to 55 degrees, or 55 degrees.

The first linear portion 100 has a first length L1, the second linear portion 102 has a second length L2, the third linear portion 104 has a third length L3, and the fourth linear portion 106 has a fourth length L4. In the exemplary embodiment, the third length L3 is equal to the fourth length L4. Further, as a result of the first angled portion 112 and the second angled portion 116, the second length L2 is less than the first length L1. Thus, with respect to the direction that the exhaust passage 59 spirals, the linear portion of the exhaust inlet port 48 adjacent the inner side is longer than the linear portion of the exhaust inlet port 48 adjacent the outer side. In one exemplary embodiment, the ratio of the first length L1 to the second length L2 is in the range of 1.25 to 1.5 or 1.33.

The one or more outer surfaces 56 of the turbine housing 54 may be configured to avoid interference between the turbine housing 54 and an installation tool, such as for example, a socket for installing the bolts 51, and provide enough clearance to make attaching of the turbocharger 30 to the exhaust manifold 22 easier for an installer. Referring to FIG. 4, in one exemplary embodiment, the one or more outer surfaces 56 of the turbine housing 54 may include one or more recessed, concave, or indented surface areas adjacent to one or more of the first axis 90, the second axis 92, the third axis 94, and the fourth axis 96. For example, the turbine housing 54 may have portions of its outer surface 56 that are recessed, such as for example, one or more grooves. The recessed portions may extend along a portion of the outer surfaces 56 parallel to one or more of the first axis 90, the second axis 92, the third axis 94, and the fourth axis 96.

In the exemplary embodiment, the turbine housing 54 includes a first recessed portion 120 adjacent the first hole 82, a second recessed portion 122 adjacent the second hole 84, a third recessed portion 124 adjacent the third hole 86, and a fourth recessed portion 126 adjacent the fourth hole 88. Each of the holes 82, 84, 86, 88 has an assembling clearance defined as the closest radial distance between the central axis of the hole and a surface of the turbine housing at a position along the central axis that is exterior to the hole. In other words, the assembling clearance is associated with the clearance between the turbine housing and an installation tool, such as a socket or socket extension, used to drive the bolts 51 to attach the turbocharger 30 to the exhaust manifold 22.

As shown in FIG. 4, the first hole 82 has a first assembling clearance C1, the second hole 84 has a second assembling clearance C2, the third hole 86 has a third assembling clearance C3, and the fourth hole 88 has a fourth assembling clearance C4. In the illustrated embodiments, the assembling clearances C1-C4 (i.e., the closest radial distance between the central axis of each of the holes and a surface of the turbine housing) are at the recessed portions 120, 122, 124, 126 for each of the holes 82, 84, 86, 88. In other embodiments, however, one or more of the assembling clearances may be at other portions of the turbine housing 54. In some exemplary embodiments, each of the assembling clearances C1-C4 is greater than 11.5 mm, or greater than 12 mm, or greater than 12.5 mm.

Referring to FIG. 2, in the illustrated embodiment, the exhaust manifold 22 has a central manifold portion 140 in fluid communication with a first pair of the cylinders 12, a first lateral manifold portion 142 in fluid communication with a second pair of the cylinders 12, and a second lateral manifold portion 144 opposite the first lateral manifold portion 142 and in fluid communication with a third pair of the cylinders 12.

Figure 6:
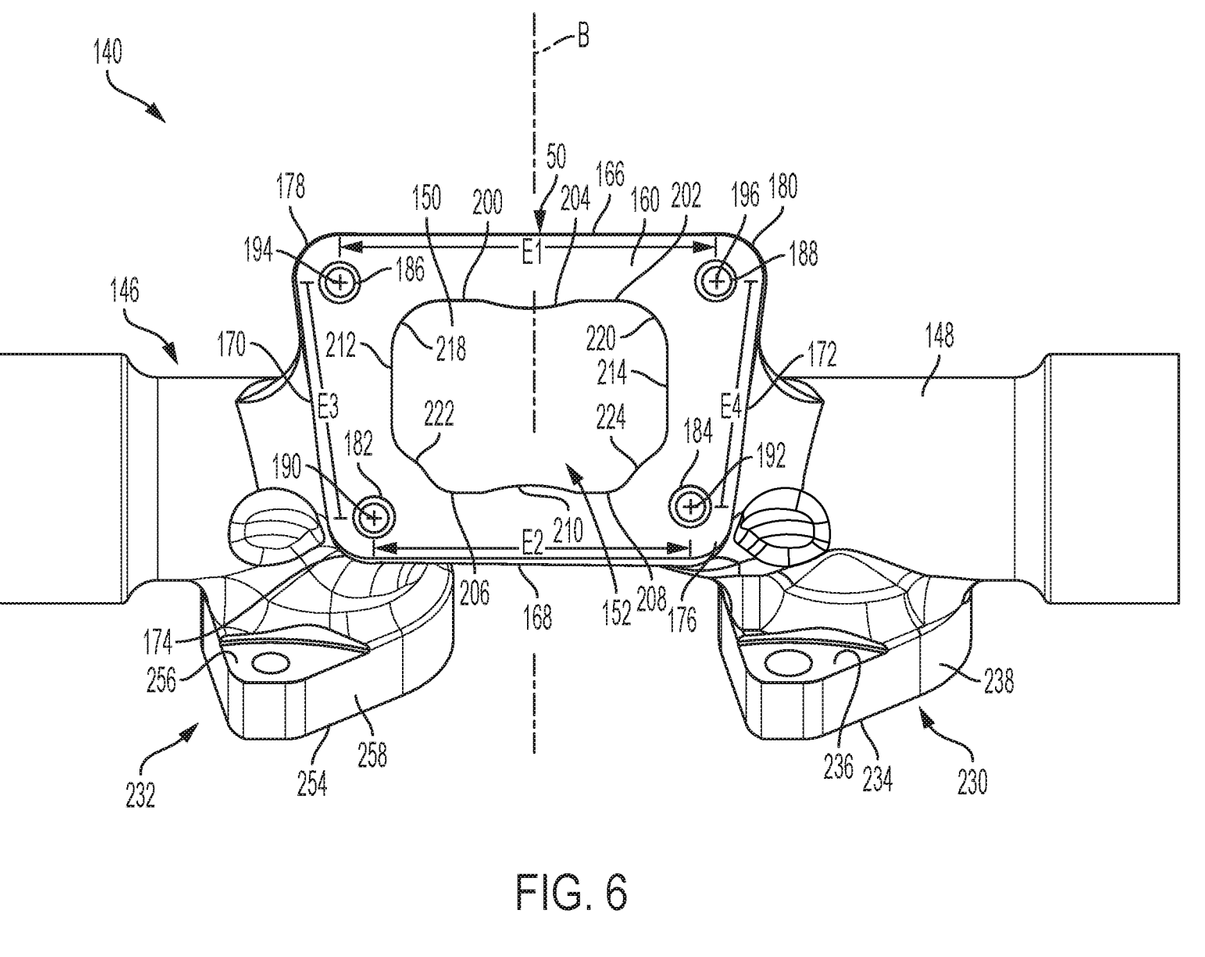
FIG. 6 is a front view of an exemplary embodiment of an exhaust outlet flange for the exhaust manifold of FIG. 2.
Figure 7:
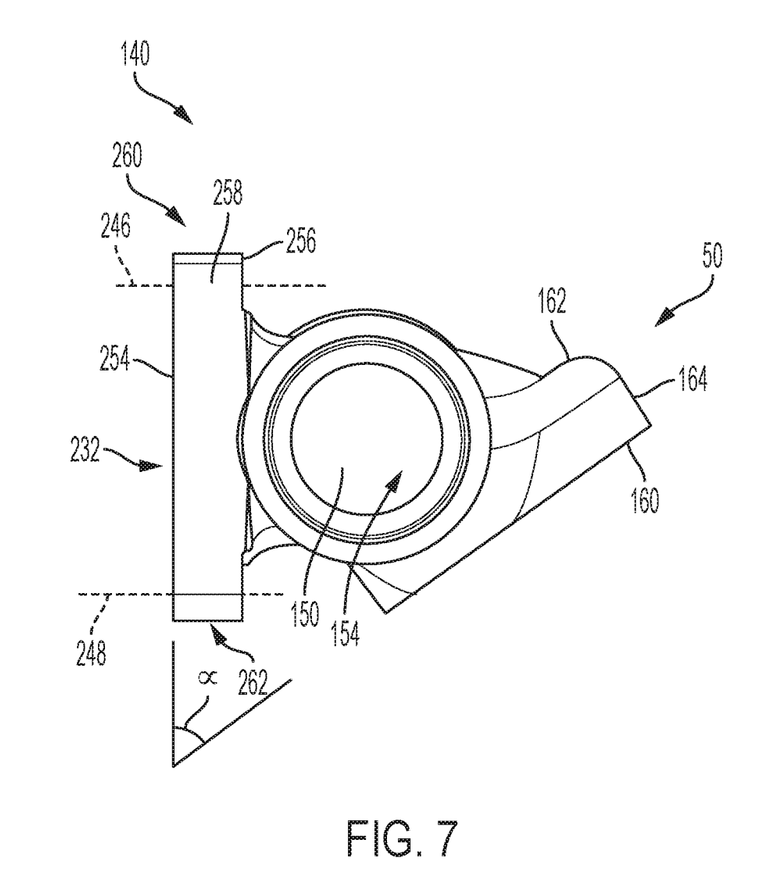
FIG. 7 is a side view of a central portion of the exhaust manifold of FIG. 2.
Figure 8:
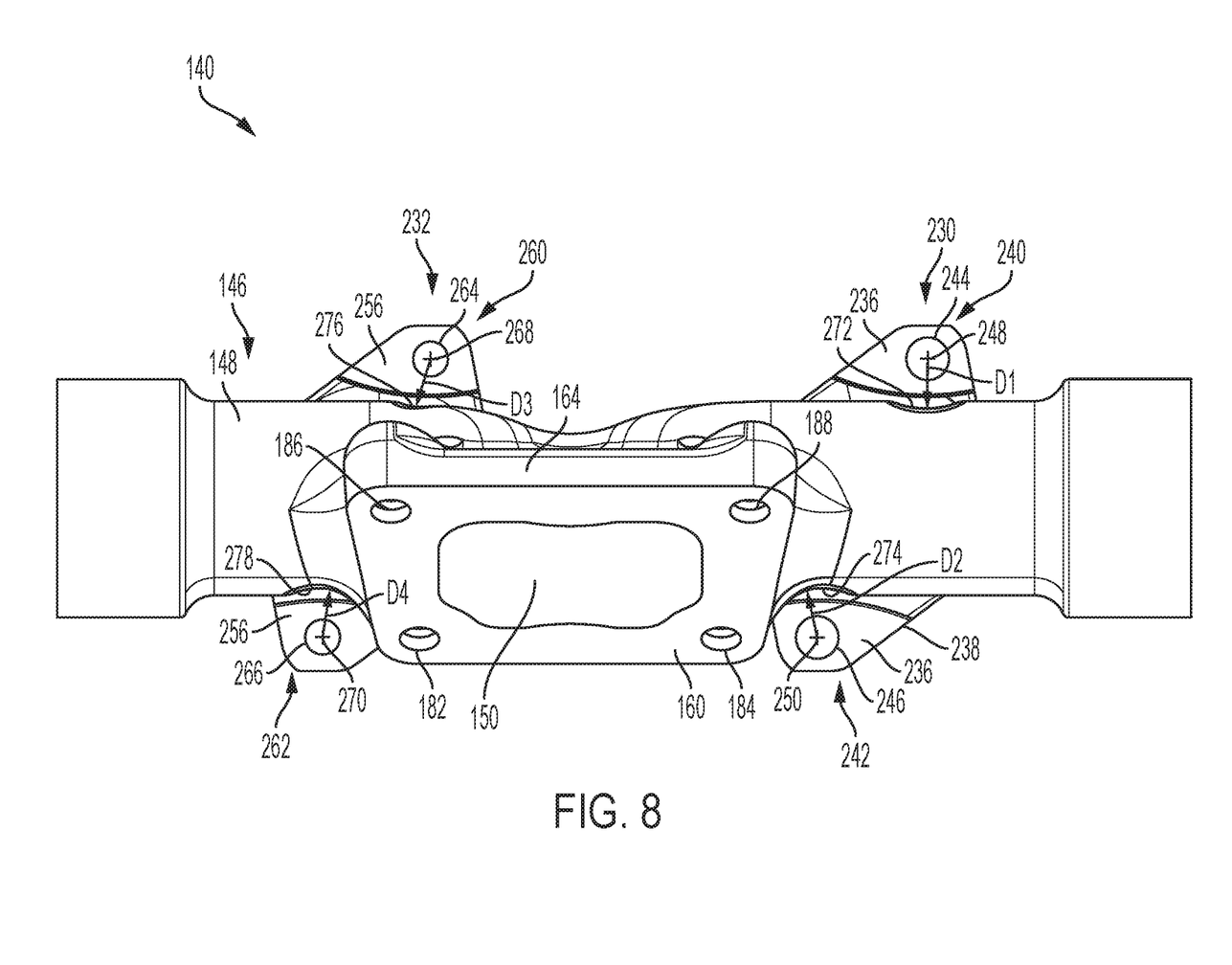
FIG. 8 is a top-front view of the exhaust manifold of FIG. 2.

Referring to FIGS. 6-8, the central manifold portion 140 of the exhaust manifold 22 has a generally cylindrical, tubular body 146 having an outer surface 148 and an inner surface 150 defining an exhaust outlet port 152 and an exhaust passage 154 in fluid communication with the exhaust outlet port 152.

In the illustrated embodiment, the inner surface 150 bounding the exhaust passage 154 is integral with and transition smoothly into the exhaust manifold outlet flange 50 such that the exhaust passage 154 smoothly transitions into the exhaust outlet port 152. The exhaust manifold outlet flange 50 includes a planar end face 160, an exterior surface 162 opposite the end face 160, and a peripheral edge 164 connecting the end face 160 to the exterior surface 162. In the illustrated embodiment, the peripheral edge 164 includes a first outer edge 166, a second outer edge 168 parallel to and opposite the first outer edge 166, a third outer edge 170 extending between the first outer edge 166 and the second outer edge 168, and a fourth outer edge 172 opposite the third outer edge 170 and extending between the first outer edge 166 and the second outer edge 168.

The second outer edge 168 transitions to the third outer edge 170 via a first rounded corner 174 and transitions to the fourth outer edge 172 via a second rounded corner 176. The first outer edge 166 transitions to the third outer edge 170 via a third rounded corner 178 and transitions to the fourth outer edge 172 via a fourth rounded corner 180.

The exhaust manifold outlet flange 50 includes a plurality of bolt holes for mounting the turbocharger 30 to the exhaust manifold 22. In the illustrated embodiment, a first hole 182 is positioned adjacent the first rounded corner 174, a second hole 184 is positioned adjacent the second rounded corner 176, a third hole 186 is positioned adjacent the third rounded corner 178, and a fourth hole 188 is positioned adjacent the fourth rounded corner 180. The first hole 182 is centered on a first axis 190 that extends perpendicular to the end face 160, the second hole 184 is centered on a second axis 192 that extends perpendicular to the end face 160, the third hole 186 is centered on a third axis 194 that extends perpendicular to the end face 160, and the fourth hole 188 is centered on a fourth axis 196 that extends perpendicular to the end face 60.

In the illustrated embodiment, the first axis 190 is a first distance E1 from the second axis 192, the third axis 194 is a second distance E2 from the fourth axis 196, the first axis 190 is a third distance E3 from the third axis 194, and the second axis 192 is a fourth distance E4 from fourth axis 196. In the exemplary embodiment, the first distance E1 is less than the second distance E2 and the third distance E3 is equal to the fourth distance E4. In the exemplary embodiment, a first line intersecting the first axis 190 and the second axis 192 is parallel to a second line intersecting the third axis 194 and the fourth axis 196. Thus, the bolt pattern for the exhaust manifold outlet flange 50 takes the shape of a trapezoid. Likewise, the third outer edge 170 and the fourth outer edge 172 taper inward from the first outer edge 166 to the second outer edge 168; thus, the outer edges of the exhaust manifold outlet flange 50 also take the shape of a trapezoid.

In one exemplary embodiment, the first distance E1 is in the range of 90 mm to 100 mm, or 95 mm and the second distance E2 is in the range of 108 mm to 118 mm, or 113 mm. Thus, the ratio of the first distance E1 to the second distance E2 is in the range of 1.08 to 1.31, or 1.19. The third distance E3 and the fourth distance E4 are in the range of 65 mm to 75 mm, or 70 mm.

In an exemplary embodiment, the exhaust outlet port 152 is a single, open port that is symmetric about a central axis B. Thus, the exhaust outlet port 152 is not divided into two ports by a dividing wall and is the sole exhaust outlet port for the exhaust manifold 22. In other embodiments, however, the exhaust outlet port 152 may not be symmetric about the central axis B. The exhaust outlet port 152 includes a first linear portion 200 and a second linear portion 202 collinear to the first linear portion 200 and separated from the first linear portion 200 by a first inward curved portion 204. The exhaust outlet port 152 further includes a third linear portion 206 opposite and parallel to the first linear portion 200 and a fourth linear portion 208 opposite and parallel to the second linear portion 202. The third linear portion 206 is collinear to the fourth linear portion 208 and separated from the fourth linear portion 208 by a second inward curved portion 210.

The exhaust outlet port 152 further includes a fifth linear portion 212 perpendicular to and extending between the first linear portion 200 and the third linear portion 206, and a sixth linear portion 214 parallel to the fifth linear portion 212 and perpendicular to and extending between the second linear portion 202 and the fourth linear portion 208.

The first linear portion 200 transitions to the fifth linear portion 212 via a first inner rounded corner 218 and the second linear portion 202 transitions to the sixth linear portion 214 via a second inner rounded corner 220. The third linear portion 206 transitions to the fifth linear portion 212 via a first angled portion 222 and the fourth linear portion 208 transitions to the sixth linear portion 214 via a second angled portion 224.

The central manifold portion 140 includes one or more cylinder head mounting flanges for mounting the central manifold portion 140 to the one or more cylinder heads (not shown) of the engine 10. In the illustrated embodiment the central manifold portion 140 includes a first cylinder head mounting flange 230 and a second cylinder head mounting flange 232. The first cylinder head mounting flange 230 includes a planar end face 234, an exterior surface 236 opposite the end face 234, and a peripheral edge 238 connecting the end face 234 to the exterior surface 236. The first cylinder head mounting flange 230 further includes a first end 240 and a second end 242 opposite the first end 240.

The first cylinder head mounting flange 230 includes a pair of bolt holes for mounting the central manifold portion 140 to a cylinder head (not shown). In the illustrated embodiment, a first hole 244 is positioned adjacent at the first end 240 and a second hole 246 is positioned adjacent the second end 242. The first hole 244 is centered on a first axis 248 that extends perpendicular to the end face 234 and the second hole 246 is centered on a second axis 250 that extends perpendicular to the end face 234.

The second cylinder head mounting flange 232 is substantially similar to the first cylinder head mounting flange 230. The second cylinder head mounting flange 232 includes a planar end face 254, an exterior surface 256 opposite the end face 254, and a peripheral edge 258 connecting the end face 254 to the exterior surface 256. The second cylinder head mounting flange 232 further includes a first end 260 and a second end 262 opposite the first end 260.

The second cylinder head mounting flange 232 includes a pair of bolt holes for mounting the central manifold portion 140 to a cylinder head (not shown). In the illustrated embodiment, a first hole 264 is positioned adjacent at the first end 260 and a second hole 266 is positioned adjacent the second end 262. The first hole 264 is centered on a first axis 268 that extends perpendicular to the end face 254 and the second hole 266 is centered on a second axis 270 that extends perpendicular to the end face 254.

As shown in FIG. 6, the planar end face 160 of the exhaust manifold outlet flange 50 extends at an angle α relative to the planar end face 254 of the second cylinder head mounting flange 232. In the illustrated embodiment, the angle is in the range of 50 degrees to 60 degrees, or 55 degrees. In other embodiments, however, the angle may be greater than 60 degrees or less than 50 degrees.

The outer surface 148 of the central manifold portion 140 may be configured to avoid interference between the central manifold portion 140 and an installation tool, such as for example, a socket for installing the bolts 28, and provide enough clearance to attach of the central manifold portion 140 to one or more cylinder heads (not shown) easier for an installer. Referring to FIGS. 6 and 8, in one exemplary embodiment, the outer surface 148 of the central manifold portion 140 may include one or more recessed, concave, or indented surface areas adjacent to one or more of the first axes 248, 268 and/or one or more of the second axis 250, 270. In one exemplary embodiment, the outer surface 148 cylindrical, tubular body 146 of the central portion includes one or more recessed, concave, or indented surface portions.

In the exemplary embodiment, the central manifold portion 140 includes a first recessed portion 272 adjacent the first hole 244 of the first cylinder head mounting flange 230, a second recessed portion 274 adjacent the second hole 246 of the first cylinder head mounting flange 230, a third recessed portion 276 adjacent the first hole 264 of the second cylinder head mounting flange 232, and a fourth recessed portion 278 adjacent the second hole 266 of the second cylinder head mounting flange 232. Each of the holes 244, 246, 264, 266 has an assembling clearance defined as the closest radial distance between the central axis of the hole and an outer surface of the central manifold portion 140 or an outer surface of the turbine housing 54 when assembled to the central manifold portion 140, at a position along the central axis that is exterior to the hole. In other words, the assembling clearance is associated with the clearance between the central manifold portion 140 or turbine housing 54 and an installation tool, such as a socket or socket extension, used to drive the bolts 28 to attach the central manifold portion 140 to the one or more cylinder heads (not shown).

As shown in FIG. 8, the first hole 244 of the first cylinder head mounting flange 230 has a first assembling clearance D1, the second hole 246 of the first cylinder head mounting flange 230 has a second assembling clearance D2, the first hole 264 of the second cylinder head mounting flange 232 has a third assembling clearance D3, and the second hole 266 of the second cylinder head mounting flange 232 has a fourth assembling clearance D4. In the illustrated embodiments, the assembling clearances D1-D4 (i.e., the closest radial distance between the central axis of each of the holes and a surface of the central manifold portion) are at the recessed portions 272, 274, 276, 278 for each of the holes 244, 246, 264, 266. In other embodiments, however, one or more of the assembling clearances may be at other portions of the central manifold portion 140. In some exemplary embodiments, each of the assembling clearances D1-D4 is greater than 14.5 mm, or greater than 15 mm, or greater than 15.5 mm.

INDUSTRIAL APPLICABILITY

Engines utilizing the turbocharger and exhaust manifold of the present disclosure can be used in a variety of applications, such as for example, to provide power to an off-highway truck, a railway locomotive, an earth-moving machine, an engine-driven generator or pumping system, or other engine-powered applications. The disclosed turbocharger and exhaust manifold are particularly well-suited for applications where spacing for the turbocharger and the exhaust manifold is constrained. For example, the turbocharger may include a tucked exhaust inlet flange which provides more compact spacing between the turbocharger and the exhaust manifold.

A more compact turbocharger and the exhaust manifold arrangement, however, can present challenges with assembly. For example, a conventional rectangular exhaust inlet flange may result in interference between an installation tool, such as a socket and a socket extension, and an exterior surface of the turbine housing and/or the exhaust manifold.

The turbocharger and the exhaust manifold of the present disclosure may include one or more features preventing interference between an installation tool and an exterior surface of the turbine housing and/or the exhaust manifold. For example, the turbine exhaust inlet flange may have novel configuration including a four hole, non-square bolt pattern with a narrower spacing between bolts on the outer side of the exhaust inlet flange, with respect to the direction that the exhaust passage spirals. The narrower spacing of the outer edge bolt holes provides additional clearance for access when bolting the turbocharger to the exhaust manifold.

The exhaust inlet port is configured to accommodate narrower spacing of the outer edge bolt holes while still being of sufficient size and design for adequate exhaust flow to the turbine. For example, the linear portion of the exhaust inlet port adjacent the inner side may be longer than the linear portion of the exhaust inlet port adjacent the outer side. Thus, the exhaust inlet port is wider adjacent the inner side than adjacent the outer side.

In addition, the recessed portions in the outer surfaces of the turbine housing and the outer surfaces of the exhaust manifold provide additional space for a socket or socket extension to engage and drive the bolts attaching the exhaust manifold to the cylinder heads and attaching the turbocharger to the exhaust manifold.

While the present disclosure has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the present disclosure, in its broader aspects, is not limited to the specific details, the representative compositions or formulations, and illustrative examples shown and described. Accordingly, departures may be made from such details without departing from the spirit or scope of Applicant's general disclosure herein.

LIST OF ELEMENTS

Element Number Element Name
10 internal combustion engine
12 cylinders
14 intake ports
16 exhaust ports
18 intake manifold
20 intake line
22 exhaust manifold
24 exhaust line
28 bolts
30 turbocharger
32 turbine portion
34 compressor portion
36 air inlet
38 air outlet
40 exhaust inlet
42 exhaust outlet
46 exhaust inlet flange
48 exhaust inlet port
50 exhaust manifold outlet flange
51 bolts
52 gasket
54 turbine housing
56 outer surfaces
58 inner surfaces
59 exhaust passage
60 end face
62 exterior surface
64 peripheral edge
66 first outer edge
68 second outer edge
70 third outer edge
72 fourth outer edge
73 inner side
74 first rounded corner
75 outer side
76 second rounded corner
78 third rounded corner
80 fourth rounded corner
82 first hole
84 second hole
86 third hole
88 fourth hole
90 first axis
92 second axis
94 third axis
96 fourth axis
100 first linear portion
102 second linear portion
104 third linear portion
106 fourth linear portion
108 first inner rounded corner
110 second inner rounded corner
112 first angled portion
114 first shallow curved portions
116 second angled portion
118 second shallow curved portions
120 first recessed portion
122 second recessed portion
124 third recessed portion
126 fourth recessed portion
140 central manifold portion 142 first lateral manifold portion
144 second lateral manifold portion
146 tubular body
148 outer surface
150 inner surface
152 exhaust outlet port
154 exhaust passage
160 end face
162 exterior surface
164 peripheral edge
166 first outer edge
168 second outer edge
170 third outer edge
172 fourth outer edge
174 first rounded corner
176 second rounded corner
178 third rounded corner
180 fourth rounded corner
182 first hole
184 second hole
186 third hole
188 fourth hole
190 first axis
192 second axis
194 third axis
196 fourth axis
200 first linear portion
202 second linear portion
204 first inward curved portion
206 third linear portion
208 fourth linear portion
210 second inward curved portion
212 fifth linear portion
214 sixth linear portion
218 first inner rounded corner
220 second inner rounded corner
222 first angled portion
224 second angled portion
230 first cylinder head mounting flange
232 second cylinder head mounting flange
234 end face
236 exterior surface
238 peripheral edge
240 first end
242 second end
244 first hole
246 second hole
248 first axis
250 second axis
254 planar end face
256 exterior surface
258 peripheral edge
260 first end
262 second end
264 first hole
266 second hole
268 first axis
270 second axis
272 first recessed portion
274 second recessed portion
276 third recessed portion
278 fourth recessed portion

What is claimed is:

1. A turbocharger, comprising:
a turbine housing having an outer surface and an inner surface defining an exhaust passage;
an exhaust inlet port in fluid communication with the exhaust passage; and
a tucked exhaust inlet flange surrounding the exhaust inlet port, the exhaust inlet flange including a plurality of bolt holes arranged in a trapezoid-shaped bolt pattern,
wherein the exhaust inlet port includes a first linear portion at an end face of the tucked exhaust inlet flange on a first side of the exhaust passage and a second linear portion at the end face of the tucked exhaust inlet flange on a second side of the exhaust passage opposite the first side,
wherein the first linear portion is longer than the second linear portion, and
wherein the first linear portion is provided adjacent an inner side of the tucked exhaust inlet flange and the second linear portion is provided adjacent an outer side of the tucked exhaust inlet flange, where the inner side of the tucked exhaust inlet flange is closer to a central axis of the turbine housing than the outer side of the tucked exhaust inlet flange is to the central axis.

2. The turbocharger of claim 1,
wherein the tucked exhaust inlet flange comprises the outer side having a first bolt hole centered on a first axis and a second bolt hole centered on a second axis and the inner side having third bolt hole centered on a third axis and a fourth bolt hole centered on a fourth axis,
wherein the third axis is a first distance from the fourth axis and the first axis is a second distance from the second axis, and
wherein the first distance is greater than the second distance.

3. The turbocharger of claim 2, wherein a ratio of the first distance to the second distance is in a range of 1.08 to 1.31.

4. The turbocharger of claim 2, wherein the first linear portion adjacent the inner side of the tucked exhaust inlet flange and the second linear portion adjacent the outer side of the tucked exhaust inlet flange are parallel to each other.

5. The turbocharger of claim 4, wherein a ratio of the first length to the second length is in a range of 1.25 to 1.5 or 1.33.

6. The turbocharger of claim 2, wherein the first bolt hole is positioned adjacent a rounded corner that extends laterally beyond a lateral outer edge.

7. The turbocharger of claim 1,
wherein a first bolt pattern of the trapezoid-shaped bolt pattern at the outer side of the tucked exhaust inlet flange is separated by a first distance that is less than a second distance of a second bolt pattern of the trapezoid-shaped bolt pattern at the inner side of the tucked exhaust inlet flange opposite the outer side of the tucked exhaust inlet flange, and
wherein the exhaust inlet port is undivided and an only exhaust inlet port of the turbocharger.

8. The turbocharger of claim 1,
wherein the tucked exhaust inlet flange is tucked relative to the turbine housing such that a distance from the central axis of the turbine housing to a plane extending to the end face of the tucked exhaust inlet flange in a side view of the turbine housing along a first line is less than or equal to a radius of the turbine housing in the side view from the central axis to an outer surface of the turbine housing along the first line, and
wherein the end face of the tucked exhaust inlet flange is planar, the turbine housing circumscribes the central axis, and the distance between the first plane and the central axis along the first line is in the range of 50% to 80% of the radius of the turbine housing along the first line.

9. The turbocharger of claim 1, wherein the turbine housing has a minimum assembling clearance greater than 11.5 mm relative to each of the plurality of bolt holes arranged in the trapezoid-shaped bolt pattern.

10. The turbocharger of claim 9, wherein the minimum assembling clearance is associated with a recessed portion adjacent at least one of the plurality of bolt holes in the tucked exhaust inlet flange.

11. An internal combustion engine, comprising:
one or more cylinders;
an exhaust manifold in fluid communication with the one or more cylinders; and
a turbocharger having a turbine portion in fluid communication with the exhaust manifold, the turbocharger comprising:
turbine housing having an outer surface and an inner surface defining an exhaust passage;
an exhaust inlet port in fluid communication with the exhaust passage; and
an exhaust inlet flange surrounding the exhaust inlet port, the exhaust inlet flange including a plurality of bolt holes arranged in a trapezoid shaped bolt pattern,
wherein a first opening defined by the exhaust inlet port has a first geometry that is mismatched with respect to a second geometry of a second opening defined by an exhaust outlet port of the exhaust manifold that faces and is adjacent to the inlet port, and
wherein the first opening tapers from wide to narrow from an inner side of the exhaust inlet flange toward an outer side of the exhaust inlet flange, where the inner side of the exhaust inlet flange is closer to a central axis of the turbine housing than the outer side of the exhaust inlet flange is to the central axis.

12. The internal combustion engine of claim 11,
wherein the exhaust inlet flange comprises the outer side having a first bolt hole centered on a first axis and a second bolt hole centered on a second axis and the inner side having third bolt hole centered on a third axis and a fourth bolt hole centered on a fourth axis,
wherein the third axis is a first distance from the fourth axis and the first axis is a second distance from the second axis, and
wherein the first distance is greater than the second distance.

13. The internal combustion engine of claim 12, wherein a ratio of the first distance to the second distance is in a range of 1.08 to 1.31.

14. The internal combustion engine of claim 12,
wherein the exhaust inlet port includes a first linear portion adjacent the inner side of the exhaust inlet flange and a second linear portion, parallel to the first linear portion, and adjacent the outer side of the exhaust inlet flange, and
wherein the first linear portion has a first length and the second linear portion has a second length that is less than the first length.

15. The internal combustion engine of claim 14, wherein a ratio of the first length to the second length is in a range of 1.25 to 1.5 or 1.33.

16. The internal combustion engine of claim 12, wherein the first bolt hole is positioned adjacent a rounded corner that extends laterally beyond a lateral outer edge.

17. The internal combustion engine of claim 11, wherein the exhaust inlet port is undivided and an only exhaust inlet port of the turbocharger.

18. The internal combustion engine of claim 11,
wherein the exhaust inlet flange has a planar end face defining a first plane and the turbine housing circumscribes the central axis, and
wherein the exhaust inlet flange is tucked relative to the turbine housing such that a distance between the first plane and the central axis along a first line is in a range of 50% to 80% of a radius of the turbine housing along the first line.

19. The internal combustion engine of claim 11, wherein the turbine housing has a minimum assembling clearance greater than 11.5 mm relative to each of the plurality of bolt holes.

20. The internal combustion engine of claim 19, wherein the minimum assembling clearance is associated with a recessed portion adjacent at least one of the bolt holes in the exhaust inlet flange.

* * * * *